United States Patent [19]

Belforte et al.

[11] Patent Number: 4,473,900
[45] Date of Patent: Sep. 25, 1984

[54] MODULAR STRUCTURE FOR MULTISTAGE PCM SWITCHING NETWORK

[75] Inventors: Piero Belforte, Turin; Mario Bondonno, Borgaro Torinese; Enzo Garetti, Turin; Giancarlo Guaschino, Turin; Luciano Pilati, Turin, all of Italy

[73] Assignee: CSELT Centro Studi Laboratori Telecommunicazioni S.p.A., Turin, Italy

[21] Appl. No.: 339,101

[22] Filed: Jan. 13, 1982

[30] Foreign Application Priority Data

Jan. 15, 1981 [IT] Italy ............................... 67036 A/81

[51] Int. Cl.³ ............................................. H04J 3/00
[52] U.S. Cl. ..................................................... 370/58
[58] Field of Search ........................ 370/58, 59, 63, 64, 370/66, 65

[56] References Cited

U.S. PATENT DOCUMENTS

| 3,674,938 | 7/1972 | Jacob | 370/58 |
| 3,754,100 | 8/1973 | Jacob | 370/66 |
| 4,213,201 | 7/1980 | Gagnier et al. | 370/66 |
| 4,228,536 | 10/1980 | Gueldenpfennig et al. | 370/66 |

OTHER PUBLICATIONS

F. Viard et al., "A New Range of CIT-ALCATEL Time-Switching Telephone Exchanges", Commutat. & Transm. (France), vol. 1, No. 1, Sep. 1979, pp. 87–102.

Primary Examiner—Douglas W. Olms
Assistant Examiner—Wellington Chin
Attorney, Agent, or Firm—Karl F. Ross

[57] ABSTRACT

A five-stage PCM switching network of an automatic telephone exchange is divided into a set of outer modular units each including a first-stage and a fifth-stage matrix, a set of inner modular units each including a second-stage and a fourth-stage matrix, and a set of central modular units each including a pair of third-stage matrices. Each modular unit is provided with an individual base-level microprocessor controlling the switching of its matrices and the checking of their performance with the aid of ancillary equipment including transceivers sending back outgoing signals and samplers delivering bytes from corresponding time slots at opposite ends of an established signal path to a comparator in the associated microprocessor. Each set is divided into several subsets provided with respective intermediate-level microprocessors which control their base-level microprocessors; a top-level microprocessor, responsive to commands from a central controller, dialogues with the intermediate-level microprocessors for setting up and discontinuing calling connections between incoming PCM lines joined to inputs of the first-stage matrices and outgoing PCM lines joined to outputs of the fifth-stage matrices.

15 Claims, 6 Drawing Figures

MODULAR STRUCTURE FOR MULTISTAGE PCM SWITCHING NETWORK

CROSS-REFERENCE TO RELATED APPLICATIONS

This application refers to subject matter disclosed in commonly owned and copending applications Ser. Nos. 193,009, 235,947 and 262,933 filed by one of us, Piero Belforte, jointly with others on Oct 2, 1980, Feb. 19, 1981 and May 12, 1981, now U.S. Pat. Nos. 4,395,494, and 4,386,425, respectively. The disclosures of these applications are incorporated by reference in the present one.

FIELD OF THE INVENTION

Our present invention relates to a modular structure for a PCM switching network, especially one of the multistage type with five or more cascaded stages, forming part of an automatic exchange of a telecommunication system.

BACKGROUND OF THE INVENTION

In telephone systems, in particular, an automatic exchange may serve any number of incoming and outgoing PCM lines ranging from a few hundred in the case of a local exchange to several hundreds of thousands in the case of transit exchanges. It is therefore desirable to provide flexible switching networks essentially built up from integrated modular units whose number can be enlarged as needed. Such flexibility also requires a decentralized control of the switching operations of the individual units and of ancillary equipment serving to detect possible malfunctions; should such a malfunction occur, the number of lines affected by any partial deactivation of the network ought to be minimized. Moreover, the network should be of essentially nonblocking character to optimize its traffic-handling capacity and, of course, transit times as well as power consumption should also be at a minimum.

Various structures have already been proposed with a view to fulfilling at least some of these requirements. Thus, for example, FIG. 11 of U.S. Pat. No. 4,093,827 discloses a network with a group of three switching stages responding to routing instructions from a lower-ranking control unit individual to that group, bracketed by input and output circuits under the control of a higher-ranking central unit.

OBJECTS OF THE INVENTION

The general object of our present invention is to provide an improved PCM switching network satisfying all the aforementioned desiderata.

More particularly, our invention aims at providing a network of increased flexibility, distributed checking facilities and a high degree of efficiency in terms of the number of lines to be served with a given data-handling capacity.

SUMMARY OF THE INVENTION

A PCM switching network according to our invention, having at least five cascaded stages, comprises a set of integrated outer modular units, a set of integrated inner modular units and a set of integrated central modular units, the outer and inner modular unit being hereinafter referred to as "folded" since each of them incorporates two switching matrices pertaining to nonadjacent stages of the network. Thus, each outer modular unit includes a first-stage switching matrix with inputs connected to incoming PCM lines and a last-stage switching matrix with outputs connected to outgoing PCM lines; each inner modular unit includes a second-stage switching matrix with inputs connected to outputs of several first-stage matrices and a penultimate-stage switching matrix with outputs connected to inputs of several last-stage matrices. Each "unfolded" central modular unit includes at least one middle-stage switching matrix whose inputs are linked to outputs of several second-stage matrices and whose outputs are linked to inputs of several penultimate-stage matrices; with a network having an odd number of stages greater than five, at least one other set of "folded" modular units will be used to accommodate additional switching matrices inserted in the input and output connections of the middle-stage matrix. Each modular unit further includes ancillary circuitry connected to its input and output ends for checking the performance of the associated switching matrix or matrices. The operation of the switching matrices is controlled by a multiplicity of base-level microprocessors, one for each modular unit, each of which is responsive to routing instructions from a higher-level controller and is connected not only to the associated switching matrix or matrices but also to the ancillary circuitry of the unit for the detection of operational errors.

Pursuant to a more particular feature of our invention, the ancillary circuitry of each modular unit comprises an upstream sampler and a downstream sampler for each switching matrix thereof, each upstream sampler having inputs directly connected to those of the associated matrix while each downstream sampler has inputs at least indirectly connected to the outputs of its matrix. The two samplers thus connected across a matrix extract respective bit combinations which are fed, with the necessary relative delay compensating for transit time, to comparison means within the associated microprocessor for the detection of possible disparities therebetween.

In order to facilitate detection of transmission errors not only in the switching matrices themselves but also in their interstage connections, the ancillary circuitry of at least the modular units following those of the first network stage advantageously further comprises transceivers connected to the inputs of switching matrices of subsequent stages for feeding back bit combinations, identical with those extracted by the associated upstream samplers, to downstream samplers of preceding stages. More particularly, we may provide an output transceiver immediately downstream of each preceding switching matrix and an input transceiver immediately upstream of each subsequent switching matrix, these input and output transceivers being integrated with their associated matrices in the respective modular units. Alternatively, and as more fully described hereinafter, each modular unit may include one or two input/output transceivers interconnected by two-way links to establish signal paths through all the stages of the network. In the latter instance we prefer to provide each unit additionally with one or two feedback transceivers interconnected by bidirectional links to establish testing connections independent of the aforementioned signal paths.

Certain features of our invention, as will become apparent, can also be used to advantage with networks of one more switching stages numbering less than five.

BRIEF DESCRIPTION OF THE DRAWING

The above and other features of our present invention will now be described in detail with reference to the accompanying drawing in which.

SPECIFIC DESCRIPTION

Figure 1:
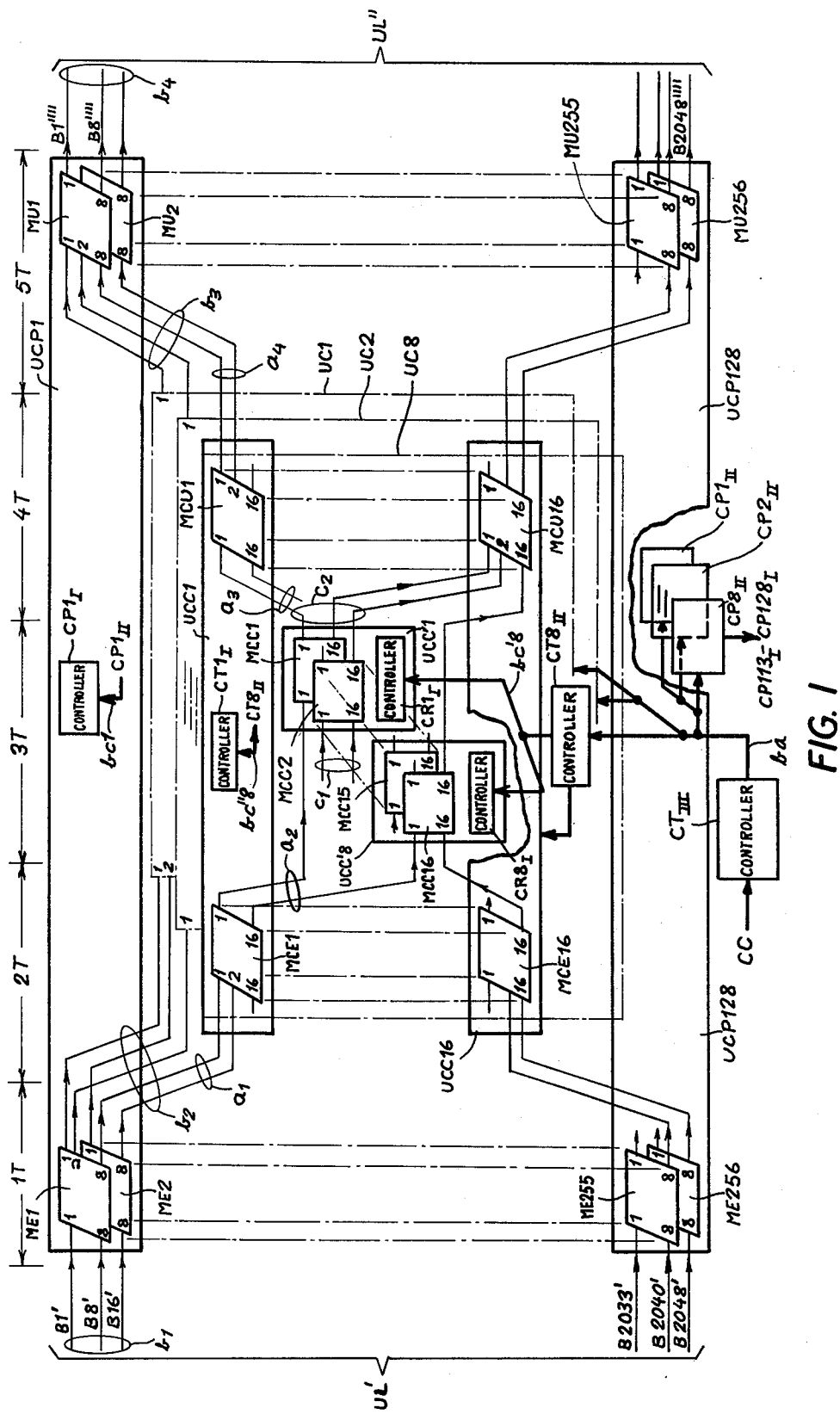
FIG. 1 is a block diagram showing the principal components of our improved switching network.

In FIG. 1 we have shown a 5-stage switching network inserted between a PCM terminal UL' with 2,048 incoming lines and a PCM terminal UL" with as many outgoing lines. Each of these lines is assumed, in accordance with conventional practice, to carry recurrent frames of 32 time slots each representing as many channels per line. Each time slot has a duration of approximately 4 $\mu$s equaling, with 8-bit coding of digitized voice samples 8-bit intervals of about 500 ns duration. By temporal and/or spatial transposition within each network stage, any incoming channel may communicate with any outgoing channel. In the specific instance here depicted, the network must thus have a capacity of establishing up to approximately 64,000 signal paths.

The five switching stages have been designated 1T through 5T. The first stage 1T encompasses 256 switching matrices ME1, ME2, ... ME 255, ME 256 each having 8 input terminals and 8 output terminals; the 2,048 inputs of this group of matrices are connected to respective lines B1', ... B8', ... B16', ... B2,033', ... B2,040', ... B2,048' of terminal UL'. Identical switching matrices MU1, MU2, ... MU255, MU256 constitute the fifth and last stage 5T, their total of 2,048 outputs being connected to respective outgoing lines B1'''', ... B'''', . .. B2,048'''' of terminal UL". In the designation of these matrices and others referred to hereinafter, the letters "E" and "U" stand for "input" (Italian: "Entrata") and "output" (Italian: "Uscita"), respectively.

The second network stage 2T encompasses a group of 128 switching matrices divided into 8 subgroups of 16 matrices each, the matrices of each subgroup being designated MCE1–MCE16. Each of the latter matrices has 16 inputs and 16 outputs, its inputs being connected to respective outputs of different first-stage matrices ME1–ME256. Analogously, the fourth or penultimate network stage 4T consists of 8 subgroups of 16 matrices each, designated MCU1–MCU16 within each subgroup. For convenience, the 8 subgroups of second-stage matrices MCE1–MCE16 are shown combined with the 8 subgroups of fourth-stage matrices MCU1–MCU16 into 8 switching planes UC1, UC2, ... UC8. The 16 outputs of each fourth-stage matrix MCU1–MCU16 are connected to respective inputs of different fifth-stage matrices MU1–MU256.

The third or middle stage of the network is represented by 8 subgroups of 16 switching matrices each, namely matrices MCC1–MCC16 of the same 16-input/16-output structure as second-stage and fourth-stage matrices MCE1–MCE16 and MCU1–MCU16. Each third-stage matrix MCC1–MCC16 has its 16 inputs connected to respective outputs of different second-stage matrices MCE1–MCE16 and has its 16 outputs connected to respective inputs of different fourth-stage matrices MCU1–MCU16 within the same switching plane, as particularly illustrated for the plane UC8.

As further indicated in FIG. 1, the 256 first-stage matrices ME1–ME256 and the 256 fifth-stage matrices MU1–MU256 have been divided into respective matrix pairs, each pair of first-stage matrices being integrated with a respective pair of fifth-stage matrices into a "folded" outer modular unit generally designated UCP. Only two such modular units have been particularly illustrated in FIG. 1, namely a unit UCP1 incorporating matrices ME1, ME2 and MU1, MU2 as well as a unit UCP128 incorporating matrices ME255, ME256 and MU255, MU256. Similarly, each second-stage matrix has been integrated with a fourth-stage matrix into a "folded" inner modular unit generally designated UCC; again, only two such units have been particularly illustrated, namely a unit UCC1 including matrices MCE1, MCU1 and a unit UCC16 including matrices MCE16, MCU16 of switching plane UC8. Finally, the third-stage matrices are integrated in pairs into "unfolded" central modular units generally designated UCC', two such units UCC'1, UCC'8 respectively including matrices MCC1, MCC2 and MCC15, MCC16 of switching plane UC8.

Figure 5:
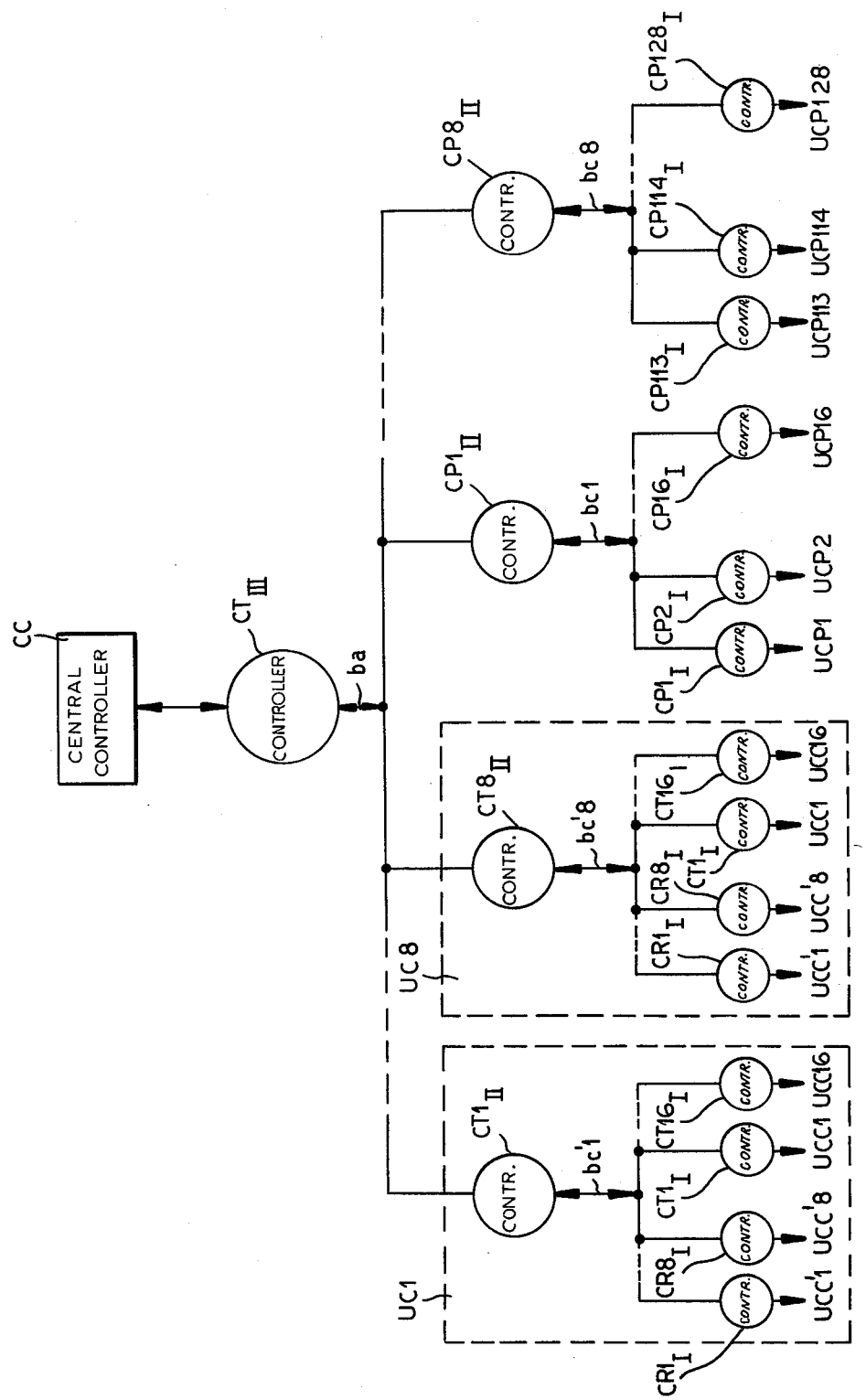
FIG. 5 is a chart showing the organization of a 3-level system for the control of the network of FIG. 1.

FIG. 5 shows a system for the control of the various modular units UCP, UCC and UCC' just described; this system is divided into three levels respectively identified by subscripts I, II and III. Each of these units is provided with an individual base-level controller, i.e. a microprocessor $CR1_I$–$CR8_I$ for each central unit UCC'1–UCC'8 of each switching plane UC1–UC8, a microprocessor $CT1_I$–$CT16_I$ for each inner unit UCC1–UCC16 thereof, and a microprocessor $CP1_I$, $CP2_I$, ... $CP16_I$, ... $CP113_I$, $CP114_I$, ... $CP128_I$ for each outer unit UCP1, UCP2, ... UCP16, ... UCP113, UCP114, ... UCP128. These microprocessors dialogue with respective intermediate-level controllers, namely microprocessor $CT1_{II}$–$CT8_{II}$, connected by two-way buses bc'1–bc'8 to all the base-level microprocessors of respective switching planes UC1–UC8, and microprocessors $CP1_{II}$–$CP8_{II}$, connected by two-way buses bc1–bc8 to respective subgroups of microprocessors $CP1_I$–$CP128_I$. A single top-level controller in the form of a microprocessor $CT_{III}$ dialogues with all the intermediate-level controllers via a two-way bus ba and, in turn, communicates with a central controller CC of the exchange. The latter, in a manner well known per se, emits switching commands to microprocessor $CT_{III}$ for establishing or terminating calling connections between channels of incoming and outgoing PCM lines while receiving, in turn, supervisory signals and malfunction indications from the hierarchical array of microprocessors. Some of these microprocessors have also been indicated in FIG. 1, namely controller $CP1_I$ for unit UCP1, controller $CT1_I$ for unit UCC1 of switching plane UC8, controllers $CR1_I$ and $CR8_I$ for units UCC'1 and UCC'8 of the same switching plane, controller $CT8_{II}$ associated with this switching plane, controllers $CP1_{II}$, $CP2_{II}$ and $CP8_{II}$ associated with respective subgroups of outer modular units, and common controller $CT_{III}$.

As further shown in FIG. 1, the eight outputs of first-stage matrix ME1 are connected to the No. 1 inputs of second-stage matrices MCE1 of respective switching planes UC1-UC8, the eight outputs of matrix ME2 are connected to the No. 2 inputs of these same second-stage matrices, and so forth; thus, the outputs of first-stage matrix ME256 are connected to the No. 16 inputs of respective matrices MCE16. In an analogous manner, the eight inputs of fifth-stage matrix MU1 are connected to the No. 1 outputs of fourth-stage matrices MCU1 of switching planes UC1-UC8, the eight inputs of matrix MU2 are connected to the No. 2 outputs of these fourth-stage matrices, and so forth, with the eight inputs of matrix MU256 connected to the No. 16 outputs of respective matrices MCU16. Within each switching plane, as particularly illustrated for plane UC8, the sixteen outputs of matrix MCE1 are connected to the No. 1 inputs of respective third-stage matrices MCC1-MCC16 while the No. 1 outputs of these latter matrices are connected to respective inputs of matrix MCU1; analogous connections exist between the other second-stage, third-stage and fourth-stage matrices of this switching plane, with the sixteen outputs of matrix MCE16 connected to the No. 16 inputs of matrices MCC1-MCC16 whose No. 16 outputs are connected to respective inputs of matrix MCU16. Thus, the network of FIG. 1 is perfectly symmetrical so as to be usable, with proper modification of switching commands emitted by the associated microprocessors, for signal transmission in either direction.

The 16 incoming lines B1'-B16' terminating at matrices ME1 and ME2, carrying 512 channels during each frame period, constitute a line multiple $b_1$ while the 16 connections leaving these two matrices form a line multiple $b_2$. The latter is divided into 8 lead pairs extending to switching planes UC1-UC8, the pair terminating at matrix MCE1 becoming part of a line multiple designated $a_1$. The 16 output leads of matrix MCE1 constitute a line multiple $a_2$ and become part of respective line multiples $c_1$ entering matrices MCC1-MCC16; an output multiple $c_2$ of each of these matrices has leads entering matrix MCU1 as part of a multiple $a_3$. A line multiple $a_4$, leaving the output terminals of matrix MCU1, had leads merging with those from corresponding matrices of other switching planes into a line multiple $b_3$ terminating at matrices MU1 and MU2; a 16-lead output multiple of these two matrices, including lines B1'''' and B8'''', has been designated $b_4$. The same designations have been employed in FIGS. 2-4.

Figure 2:
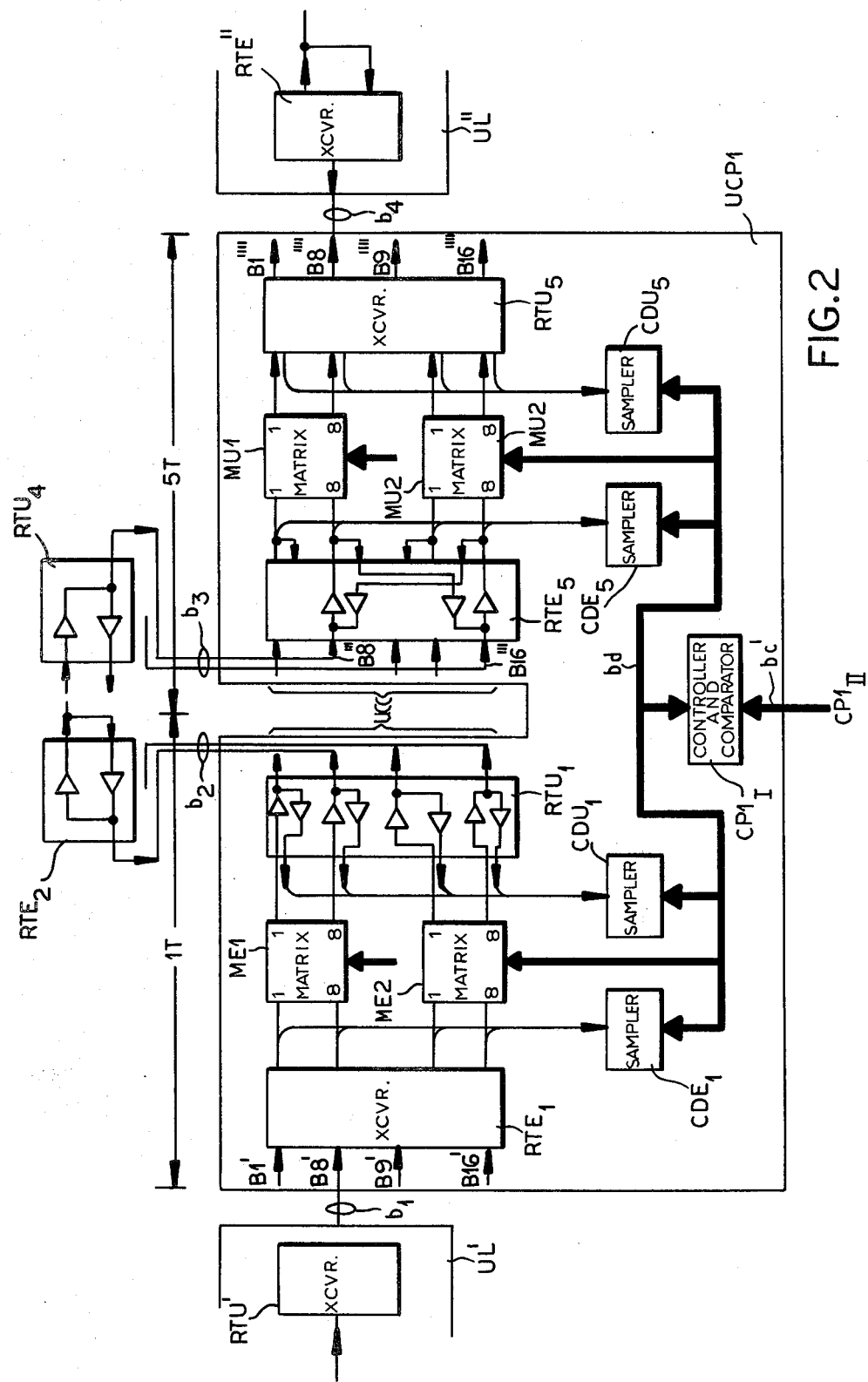
FIG. 2 is a more detailed block diagram of an outer modular unit forming part of the network of FIG. 1.

FIG. 2 gives details of outer modular unit UCP1 together with associated parts of incoming and outgoing PCM terminals UL' and UL''. These terminals are shown provided with respective transceivers RTU' and RTE'' of which, however, only the latter plays a part in checking the operation of the network as described hereinafter. Output transceiver RTU' as well as an input transceiver $RTE_1$ in the input of unit UCP1 are provided only for reasons of symmetry, in order to facilitate signal transmission from terminal UL'' to terminal UL' if this should be desired, and are transparent to the signals arriving from terminal UL' via leads B1', ... B8', B9', ... B16' of multiple $b_1$.

Unit UCP1 further includes an output transceiver $RTU_1$, downstream of matrices ME1 and ME2, as well as input and output transceivers $RTE_5$, $RTU_5$ respectively disposed upstream and downstream of matrices MU1 and MU2. All these transceivers, along with those of other network stages shown in subsequent Figures (including a second-stage input transceiver $RTE_2$ and a fourth-stage output transceiver $RTU_4$, also shown in FIG. 2), are of a type disclosed in the aforementioned copending application Ser. No. 193,009 with a unidirectional input, a unidirectional output and a bidirectional connection joined to that input and output by amplifier means canceling on the output a signal fed from the input to the bidirectional connection. The signal-balancing amplifiers of such a transceiver, which have a predetermined gain ratio as described in the copending application, have been schematically indicated in boxes $RTU_1$, $RTE_2$, $RTU_4$ and $RTE_5$.

The 8-input/8-output matrices ME1, ME2 and MU1, MU2 of unit UCP1 are advantageously of the type disclosed in the aforementioned copending application Ser. No. 262,933 (U.S. Pat. No. 4,386,425), each including a byte memory and a routing memory controlled by a logic network for performing temporal and/or spatial transpositions between time slots of incoming and outgoing channels within a frame period; the logic network, in response to certain instructions from the associated microprocessor, can load the routing memory with an inhibiting bit temporarily blocking the readout of a designated cell of the byte memory.

As further illustrated in FIG. 2, each pair of matrices ME1, ME2 and MU1, MU2 is bracketed by a pair of samplers, i.e. upstream and downstream samplers $CDE_1$, $CDU_1$ in the case of the first-stage matrices ME1, ME2 and samplers $CDE_5$, $CDU_5$ in the case of the fifth-stage matrices MU1, MU2. Each upstream sampler $CDE_1$, $CDE_5$ has inputs directly connected to those of the associated switching matrices while the inputs of each downstream sampler $CDU_1$, $CDU_5$ are connected to those of the associated matrices via a loop including the two immediately following tranceivers, namely components $RTU_1$, $RTE_2$ in the first instance and $RTU_5$, RTE'' in the second instance. For this purpose, the downstream input transceivers $RTE_2$, $RTE_5$, RTE'' have feedback loops extending from their unidirectional outputs to their unidirectional inputs whereby echoes of outgoing signals are returned to the immediately preceding output transceivers $RTU_1$, $RTU_4$, $RTU_5$ via bidirectional connections forming part of the intervening line multiples $b_2$, $b_3$ and $b_4$.

Samplers $CDE_1$, $CDU_1$, $CDE_5$, $CDU_5$ are preferably of a type disclosed in the aforementioned copending application Ser. No. 235,947, including means such as a pair of cascaded pulse counters for extracting presumably identical bytes from corresponding time slots of a bit stream traversing the associated matrix and for feeding the extracted bytes to the associated microprocessor with a delay compensating the transit time between the upstream and the downstream location. In the present instance, that delay includes not only the time needed for traversing the matrix itself but also the interval during which a particular byte passes back and forth through the immediately following two transceivers. The bytes so extracted by the samplers of unit UCP1 are fed via a bidirectional bus bd to the associated microprocessor $CP1_f$ which includes a comparator determining whether or not these bytes significantly differ from each other; if they do, an alarm signal is generated and transmitted through the microprocessor chain to the central controller CC (FIG. 5) for the initiation of corrective measures possibly including the temporary deactivation of the modular unit concerned.

It should be noted that the higher-level controllers shown in FIG. 5 are checked for correct operation by conventional means such as parity-bit detectors.

The return of an echo of an outgoing signal by a feedback loop of a distant transceiver advantageously uses a path different from that traveled by the signal itself. This measure is designed to prevent the reflection of a signal at a possible open circuit of its path from being erroneously interpreted as an echo by, say, sampler $CDU_1$ or $CDU_5$. As particularly illustrated by way of example in FIG. 2, transceiver $RTE_5$ directs echoes of signals arriving from transceiver $RTU_4$ on a lead $B8'''$, forming part of multiple $b_3$, to a lead $B16'''$ of the same multiple, and vice versa; leads $B8'''$ and $B16'''$ are the pair (also included in multiple $a_4$) extending in FIG. 1 between fourth-stage matrix MCU1 of unit UCC1 and the No. 8 inputs of matrices MU1, MU2 of unit UCP1. Similar transpositions take place in transceiver RTE" and in other downstream input transceivers between paired leads from a given modular unit. Naturally, microprocessor $CP1_I$ and its counterparts in other units are programmed to compare outgoing bytes with returning bytes appearing in the proper time slots on the echo paths so correlated with the respective signal paths.

Figure 3:
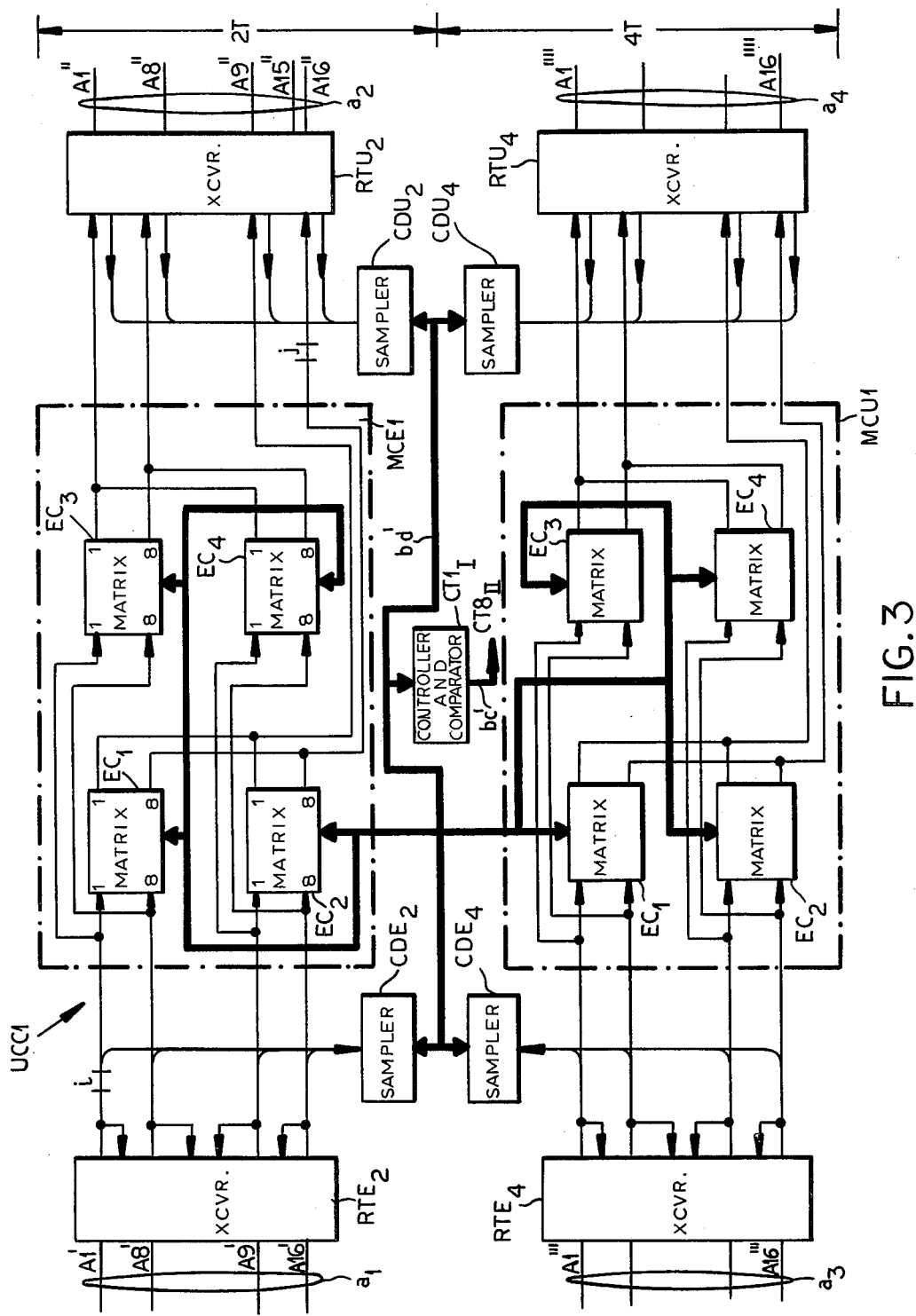
FIG. 3 is a block diagram of an inner modular unit forming part of that network.

FIG. 3 shows details of the two 16-input/16-output matrices MCE1 and MCU1 forming part of inner modular unit UCC1. Each of these larger switching matrices consists of an array of four elemental matrices $EC_1$–$EC_4$ as illustrated in FIG. 3 of the aforementioned copending application Ser. No. 262,933 (U.S. Pat. No. 4,386,425). These elemental matrices are substantially identical with the simple switching matrices ME1–ME256, MU1–MU256 of network stages 1T and 5T. Signals arriving on leads $A1'$–$A8'$ of multiple $a_1$, after traversing the input transceiver $RTE_2$ also shown in FIG. 2, are fed in parallel to the eight inputs of elemental matrices $EC_1$ and $EC_3$ of switching matrix MCE1; signals present on the remaining leads $A9'$–$A16'$ of the same multiple are fed in parallel to the eight inputs of the other pair of elemental matrices $EC_2$, $EC_4$ of that switching matrix. Corresponding outputs of elemental matrices $EC_3$ and $EC_4$ of switching matrix MCE1 are joined via so-called "wired OR" connections to respective leads $A1''$–$A8''$ of multiple $a_2$ emanating from an output transceiver $RTU_2$; corresponding outputs of the remaining elemental matrices $EC_1$ and $EC_2$ of that switching matrix are similarly connected to respective leads $A9''$–$A16''$ of multiple $a_2$. In a completely analogous manner, signals on leads $A1'''$–$A16'''$ of multiple $a_3$ are fed via an input transceiver $RTE_4$ to parallel inputs of two pairs of elemental matrices of switching matrix MCU1 and are further transmitted from corresponding outputs thereof, interconnected with different pairing, to leads $A1''''$–$A16''''$ of multiple $a_4$ emanating from the output transceiver $RTU_4$ also shown in FIG. 2. Unit UCC1 is further seen to include samplers $CDE_2$ and $CDU_2$, associated with switching matrix MCE1, as well as samplers $CDE_4$ and $CDU_4$ associated with switching matrix MCU1; these samplers communicate with the associated microprocessor $CT1_I$ by way of a bidirectional bus bd'. The downstream samplers $CDU_2$ and $CDU_4$ receive echoes of outgoing signals from respective distal input transceivers $RTE_3$ (FIG. 4) and $RTE_5''$ (FIG. 2).

In FIG. 3 we have also indicated a time slot i for an outgoing byte on lead $A1'$ and a corresponding time slot j on lead $A16''$ to which the byte of time slot i has been transferred by switching matrix MCE1. The echo of the transferred byte, generated by the feedback loop of the corresponding third-stage input transceiver $RTE_3$ (FIG. 4), returns on an adjoining lead $A15''$ of submultiple $A9''$–$A16''$ (paired with lead $A16''$) and passes via transceiver $RTU_2$ to sampler $CDU_2$. As already noted, microprocessor $CT1_I$ takes into account the delay encountered by the outgoing byte and its returning echo in traversing matrix MCE1 as well as transceivers $RTU_2$ and $RTE_3$.

Figure 4:
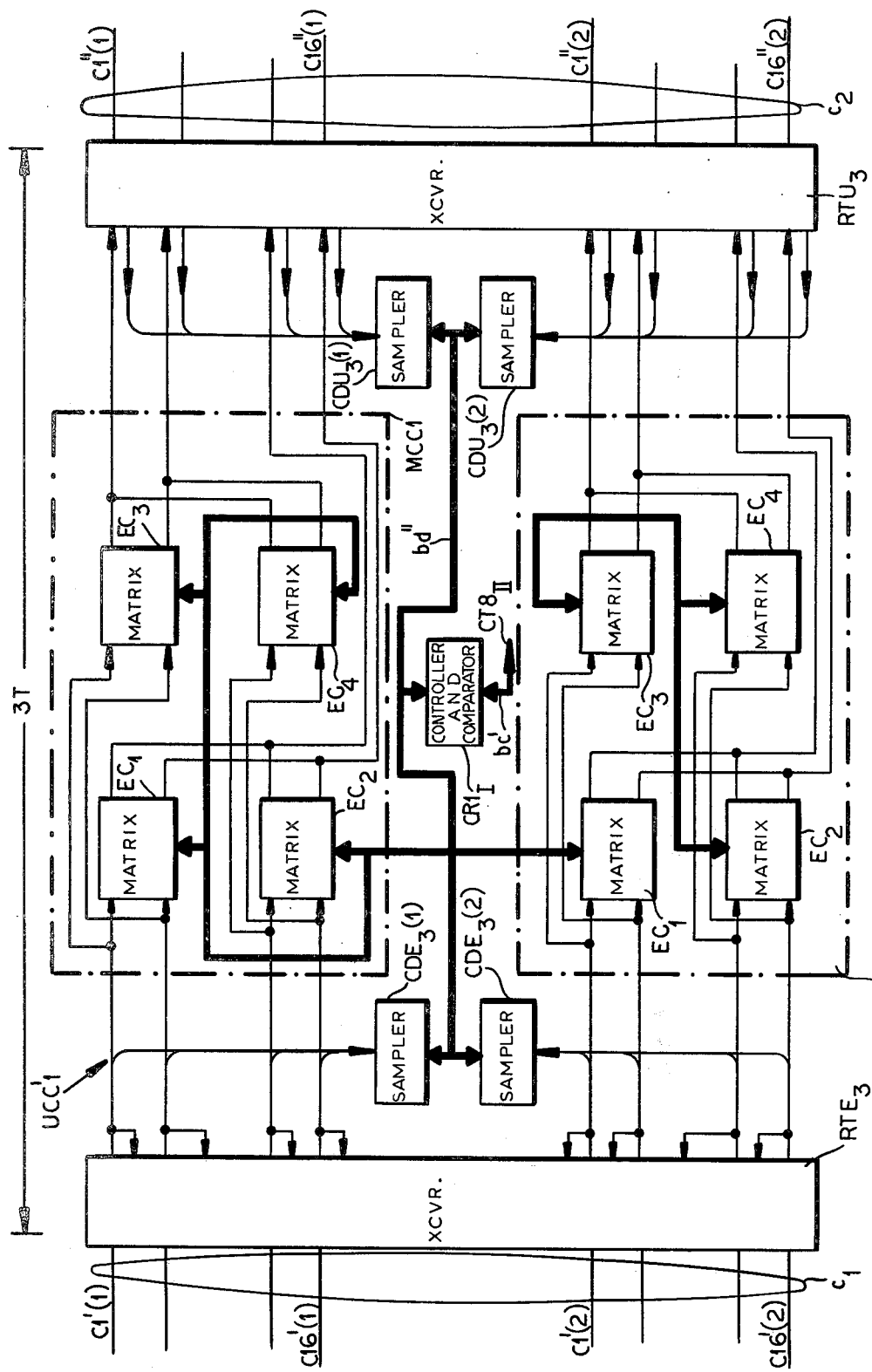
FIG. 4 is a block diagram of a central modular unit forming part of that network.

The two switching matrices MCC1 and MCC2 of central modular unit UCC'1 are shown in FIG. 4 as having the same structure as the switching matrices MCE1 and MCU1 of input modular unit UCC1, consisting each of four elemental matrices $EC_1$–$EC_4$. Signals on leads $C1'(1)$–$C16'(1)$, $C1'(2)$–$C16'(2)$ of multiple $c_1$ are fed via input transceiver $RTE_3$ to the elemental matrices of switching matrices MCC1 and MCC2 as well as to upstream samplers $CDE_3(1)$ and $CDE_3(2)$ associated therewith, again in a manner analogous to that described with reference to the matrices of FIG. 3. Outgoing signals from these switching matrices are transmitted by way of an output transceiver $RTU_3$ to leads $C1''(1)$–$C16''(1)$ and $C1''(2)$–$C16''(2)$ of multiple $C_2$. Echoes generated by following-stage input transceivers $RTE_4$ (see FIG. 3) are returned in the aforedescribed manner via transceiver $RTU_3$ to respective downstream samplers $CDU_3(1)$ and $CDU_3(2)$ associated with switching matrices MCC1 and MCC2. The four samplers of unit UCC'1 communicate by way of a bidirectional bus bd" with the associated microprocessor $CR1_I$.

In the indentical unit UCC'8 (FIG. 1), incoming leads corresponding to the leads $C1'(1)$ and $C1'(2)$ of FIG. 4 are respectively identical with leads $A15''$ and $A16''$ of FIG. 3; thus, transceiver $RTE_3$ of that unit transposes the echoes of these two leads in returning them to the sampler $CDU_2$ of unit UCC1 as described above.

Figure 6:
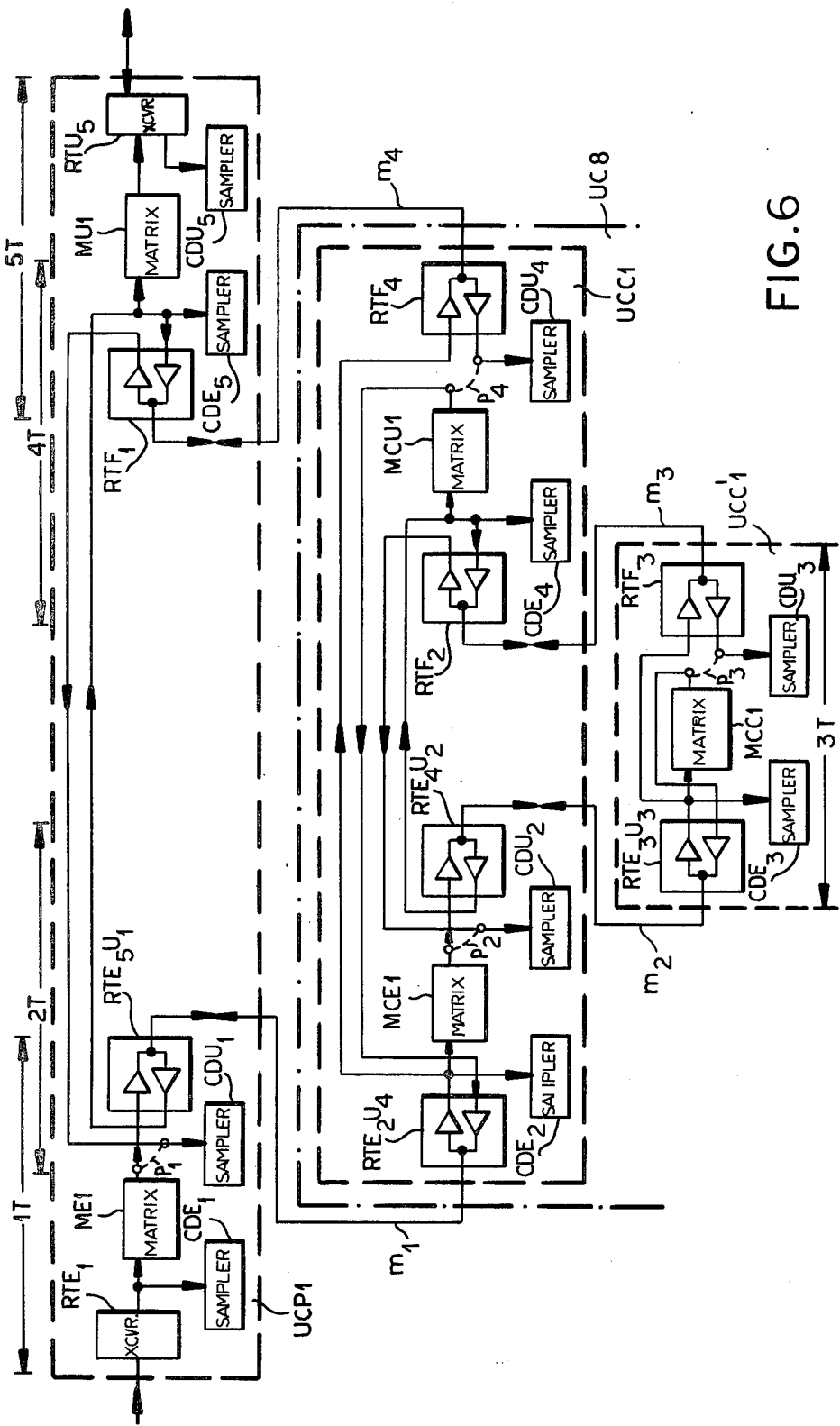
FIG. 6 is a block diagram showing modifications of the modular units illustrated in FIGS. 2–4.

We shall now describe, with reference to FIG. 6, a modification of modular units UCP1, UCC1 and UCC'1 in which the signal and echo paths are completely separated from one another. These units include the same switching matrices and samplers as in the embodiment of FIGS. 2–4 but the associated transceivers and their interconnections are different. Thus, unit UCP1 has its first-stage matrix ME1 flanked by the aforedescribed input transceiver $RTE_1$ and by an input/output transceiver $RTE_5U_1$ from which a two-way multiple $m_1$ extends to an input/output transceiver $RTE_2U_4$ in unit UCC1 associated with second-stage matrix MCE1. The latter matrix works into an input/output transceiver $RTE_4U_2$ linked by another two-way multiple $m_2$ with an input/output transceiver $RTE_3U_3$ associated with third-stage matrix MCC1 in unit UCC'1. Fifth-stage matrix MU1 in unit UCP1 transmits outgoing signals, as before, to the associated output transceiver $RTU_5$, yet its upstream sampler $CDE_5$ works into a feedback transceiver $RTF_1$ communicating via a two-way multiple $m_4$ with a similar feedback transceiver $RTF_4$ connected to sampler $CDU_4$ in unit UCC1. The latter unit further includes a feedback transceiver $RTF_2$ with its undirectional input connected to sampler $CDE_4$, this transceiver being linked by a two-way multiple $m_3$ with a similar transceiver $RTF_3$ in unit UCC'1 whose unidirectional input and output are respectively connected to samplers $CDE_3$ and $CDU_3$. The microprocessors of the various modular units have been omitted for clarity's sake.

In operation, an incoming signal traversing matrix ME1 of unit UCP1 passes through transceiver $RTE_5U_1$, link $m_1$ and transceiver $RTE_2U_4$ into matrix MCE1 of unit UCC1 from which it continues via transceiver $RTE_4U_2$, link $m_2$ and transceiver $RTE_3U_3$ into matrix MCC1. Upon exiting from that matrix, the signal retraverses transceiver $RTE_3U_3$, link $m_2$ and transceiver $RTE_4U_2$ in the opposite direction to enter matrix MCU1 of unit UCC1 whence it passes by way of transceiver $RTE_2U_4$, link $m_1$ and transceiver $RTE_5U_1$—again in the reverse direction—into matrix MU1 of unit UCP1 which sends it out of the network.

An echo generated by a transceiver RTE" (cf. FIG. 2) in the outgoing PCM terminal again returns, after transposition inside transceiver $RTU_5$, to the fifth-stage downstream sampler $CDU_5$. An echo picked up at the input of matrix MU1 by feedback transceiver $RTF_1$ passes via link $m_4$ and transceiver $RTF_4$ of unit UCC1 into the fourth-stage downstream sampler $CDU_4$ for comparison with the outgoing signal fed into parallel inputs of matrix MCU1 and upstream sampler $CDE_4$. Similarly, an echo picked up at the input of matrix MCU1 by feedback transceiver $RTF_2$ passes into the third-stage downstream sampler $CDU_3$ by way of link $m_3$ and transceiver $RTF_3$ for comparison with the input signal of matrix MCC1 also received by upstream sampler $CDE_3$. In like manner, an echo of the signal entering matrix MCC1 is picked up by feedback transceiver $RTF_3$ and passed in the opposite direction via link $m_3$ and transceiver $RTF_2$ into the second-stage downstream sampler $CDU_2$ for comparison with the signal fed to the inputs of matrix MCE1 and upstream sampler $CDE_2$. An echo of this input signal, in turn, is picked up by feedback transceiver $RTF_4$ and delivered via link $m_4$ and transceiver $RTF_1$ to the first-stage downstream sampler $CDU_1$ for comparison with the incoming signal registered in upstream sampler $CDE_1$ associated with matrix ME1.

It will be apparent that links $m_3$, $m_4$ and the associated feedback transceivers $RTF_1$–$RTF_5$ of FIG. 6 afford the same possibility as the circuitry of FIGS. 2–4 for checking not only the switching operations of the several matrices but also the continuity of the entire signal-transmission paths of the network. If such continuity checks are not needed, the feedback transceivers and their intervening links could be omitted with direct connection of downstream samplers $CDU_1$–$CDU_4$ to the outputs of their associated matrices ME1, MCE1, MCC1 and MCU1 via lead multiples $p_1$–$p_4$ indicated in dotted lines. Such an arrangement represents a considerable simplification of the network structure.

If it is desired to double the capacity of the network of FIG. 1—actually amounting to 65,536 channels—without increasing the number of stages, it is sufficient to replace the eight switching planes UC1–UC8 by twice as many planes and to substitute 256 modular units, of the type shown in FIG. 2, with 16-input/16-output switching matrices for the units UCP1–UCP128; this will maintain full accessibility to the modular units forming part of the increased number of switching planes.

If, on the other hand, the flexibility of the network is to be enhanced without changing its capacity, the number of stages may be increased to, say, seven by the introduction of an additional set of "folded" modular units. In that instance the switching matrices of all modular units may be of the elemental kind with eight inputs and eight outputs each.

The transposition of signal and echo paths, as particularly described with reference to FIG. 3, and the use of input/output transceivers to separate signals entering and leaving a given stage over a common path, as disclosed in connection with FIG. 6, are aspects of our invention also applicable to networks of fewer than five switching stages.

We claim:

1. A PCM switching network with at least five cascaded stages forming part of an automatic exchange of a telecommunication system, comprising:

a set of integrated outer modular units each including a first-stage switching matrix with inputs connected to incoming PCM lines and a last-stage switching matrix with outputs connected to outgoing PCM lines;

a set of integrated inner modular units each including a second-stage switching matrix with inputs connected to outputs of a plurality of first-stage switching matrices and a penultimate-stage switching matrix with outputs connected to inputs of a plurality of last-stage switching matrices;

a set of integrated central modular units each including at least one middle-stage switching matrix having inputs linked to outputs of a plurality of second-stage switching matrices and having outputs linked to inputs of a plurality of penultimate-stage switching matrices;

ancillary circuitry in each modular unit connected to input and output ends thereof for checking the performance of their respective switching matrices; and a multiplicity of base-level microprocessors, one for each modular unit, controlling the operation of said switching matrices in response to routing instructions from a higher-level controller, said base-level microprocessors being connected to the associated switching matrices and being further connected to said ancillary circuitry for detecting operational errors;

said ancillary circuitry comprising an upstream sampler and a downstream sampler for each switching matrix, said base-level microprocessors being provided with comparison means for detecting disparities between bit combinations respectively extracted by said upstream and downstream samplers, each upstream sampler having inputs directly connected to the inputs of the associated switching matrix, each downstream sampler having inputs at least indirectly connected to the outputs of the associated matrix.

2. A network as defined in claim 1 wherein said ancillary circuitry further comprises transceivers connected to the inputs of switching matrices of subsequent stages for feeding back bit combinations, identical with those extracted by the associated upstream samplers, to downstream samplers of preceding stages whereby transmission errors arising in interstage connections are detectable by said comparison means.

3. A network as defined in claim 2 wherein said transceivers include an output transceiver immediately downstream of each preceding switching matrix and an input transceiver immediately upstream of each subsequent switching matrix, said input and output transceivers being integrated with their associated switching matrices in the respective modular units.

4. A network as defined in claim 3 wherein each input transceiver receiving signals of an incoming PCM line from a preceding switching matrix via a transmission path including the corresponding output transceiver feeds back said signals via a return path different from said transmission path.

5. A network as defined in claim 4 wherein said return path passes through the corresponding output transceiver and coincides with a transmission path for signals from a switching matrix paired with said preceding switching matrix on a common modular unit.

6. A network as defined in claim 4 wherein said return path bypasses the corresponding output transceiver and includes a separate feedback transceiver.

7. A network as defined in claim 1 wherein said transceivers include a first input/output transceiver in each outer modular unit, a second and a third input/output transceiver in each inner modular unit and a fourth input/output transceiver in each central modular unit, said first input/output transceiver connecting the outputs of the associated first-stage switching matrix to inputs of respective second-stage switching matrices via the associated second input/output transceivers by way of intervening first two-way links, said third input/output transceiver connecting the outputs of the associated second-stage switching matrix to inputs of respective middle-stage switching matrices via the associated fourth input/output transceivers by way of intervening second two-way links, the outputs of each middle-stage switching matrix being connected via the associated fourth input/output transceiver and said second two-way links to inputs of respective penultimate-stage switching matrices through the intermediary of the third input/output transceivers of the corresponding inner modular units, the outputs of each penultimate-stage switching matrix being connected via the second input/output transceivers of the corresponding inner modular units to inputs of respective last-stage switching matrices through the intermediary of said first two-way links and the first input/output transceivers of the corresponding outer modular units.

8. A network as defined in claim 7 wherein said transceivers further include a first feedback transceiver in each of said outer modular units, a second feedback transceiver in each of said inner modular units, a third feedback transceiver in each of said central modular units, and a fourth feedback transceiver in each of said inner modular units, the inputs of each second-stage switching matrix being connected to downstream samplers associated with respective first-stage switching matrices via loops including the fourth feedback transceiver of the corresponding inner modular unit and the first feedback transceivers of the corresponding outer modular units together with intervening first bidirectional links, the inputs of each middle-stage switching matrix being connected to downstream samplers associated with respective second-stage switching matrices via loops including the third feedback transceiver of the corresponding central modular unit and the second feedback transceivers of the corresponding inner modular units together with intervening second bidirectional links, the inputs of each penultimate-stage switching matrix being connected to downstream samplers associated with respective middle-stage switching matrices via loops including the second feedback transceiver of the corresponding inner modular unit and the third feedback transceivers of the corresponding central modular units together with the intervening second bidirectional links, the inputs of each last-stage switching matrix being connected to downstream samplers associated with respective penultimate-stage switching matrices via loops including the first feedback transceiver of the corresponding outer modular unit and the fourth feedback transceivers of the corresponding inner modular units together with the intervening first bidirectional links.

9. A network as defined in claims 2, 3, 4, 5, 6, 7 or 8 wherein each of said transceivers is provided with unidirectional inputs, unidirectional outputs, and bidirectional connections joined to said inputs and outputs thereof by amplifier means canceling on said unidirectional outputs any signal fed from said unidirectional inputs to said bidirectional connections.

10. A PCM switching network forming part of an automatic exchange of a telecommunication system, comprising:
  a pair of switching matrices with inputs connected to incoming PCM lines and with outputs connected to outgoing PCM lines;
  an upstream sampler having inputs connected to those of said switching matrices;
  a first and a second transceiver inserted in cascade between the outputs of said switching matrices and said outgoing PCM lines, said second transceiver having feedback loops for picking up echoes of outgoing bit combinations received from one of said switching matrices via signal paths traversing said first transceiver and returning said echoes to inputs of said second transceiver included in signal paths extending from the other of said switching matrices;
  a downstream sampler with inputs connected to outputs of said second transceiver carrying echoes separated from outgoing bit combinations and returned to inputs of said second transceiver by said feedback loops; and
  comparison means connected to said upstream and downstream samplers for detecting disparities between bit combinations entering either of said switching matrices and corresponding echoes appearing on outputs of said second transceiver.

11. A PCM switching network with a plurality of cascaded stages forming part of an automatic exchange of a telecommunication system, comprising:
  a first-stage switching matrix with inputs connected to incoming PCM lines;
  a first-stage transceiver with unidirectional inputs connected to respective outputs of said first-stage switching matrix, said first-stage transceiver further having unidirectional outputs and bidirectional connections joined to said unidirectional inputs and outputs by amplifier means canceling on said unidirectional outputs any signal fed from said unidirectional inputs to said bidirectional connections;
  a middle-stage transceiver substantially identical with said first-stage transceiver and linked therewith via said bidirectional connections;
  a middle-stage switching matrix having inputs connected to respective unidirectional outputs of said middle-stage transceiver and having outputs connected to respective unidirectional inputs of said middle-stage transceiver; and
  a last-stage switching matrix having inputs connected to respective unidirectional outputs of said first-stage transceiver, said last-stage matrix having outputs connected to outgoing PCM lines.

12. A PCM switching network with at least five cascaded stages forming part of an automatic exchange of a telecommunication system, comprising:
  a set of integrated outer modular units each including a first-stage switching matrix with inputs connected to incoming PCM lines and a last-stage switching matrix with outputs connected to outgoing PCM lines;

a set of integrated inner modular units each including a second-stage switching matrix with inputs connected to outputs of a plurality of first-stage switching matrices and a penultimate-stage switching matrix with outputs connected to inputs of a plurality of last-stage switching matrices;

a set of integrated control modular units each including at least one middle-stage switching matrix having inputs linked to outputs of a plurality of second-stage switching matrices and having outputs linked to inputs of a plurality of penultimate-stage switching matrices;

ancillary circuitry in each modular unit connected to input and output ends thereof for checking the performance of their respective switching matrices; and a multiplicity of base-level microprocessors, one for each modular unit, controlling the operation of said switching matrices in response to routing instructions from a higher-level controller, said base-level microprocessors being connected to the associated switching matrices and being further connected to said ancillary circuitry for detecting operational errors;

the switching matrices of said inner modular units each comprising an array of four elemental matrices with n inputs and n outputs each, said first-stage and last-stage switching matrices each having n inputs and n outputs, the inputs of one pair of elemental matrices of each second-stage switching matrix being connected in parallel to respective outputs of one group of n first-stage switching matrices, the inputs of another pair of elemental matrices of each second-stage switching matrix being connected in parallel to respective outputs of another group of n first-stage switching matrices, the outputs of one member of said one pair and one member of said other pair of elemental matrices of each second-stage switching matrix being connected in parallel to respective inputs of one group of n middle-stage switching matrices, the outputs of the remaining members of said pairs of elemental matrices of each second-stage switching matrix being connected in parallel to respective inputs of another group of n middle-stage switching matrices, the inputs of one pair of elemental matrices of each penultimate-stage switching matrix being connected in parallel to respective outputs of one group of n middle-stage switching matrices, the inputs of another pair of elemental matrices of said penultimate-stage switching matrix being connected in parallel to respective outputs of another group of n middle-stage switching matrices, the outputs of one member of said one pair and one member of said other pair of elemental matrices of each penultimate-stage switching matrix being connected in parallel to respective inputs of one group of n last-stage switching matrices, the outputs of the remaining members of said pairs of elemental matrices of each penultimate-stage switching matrix being connected in parallel to respective inputs of another group of n last-stage switching matrices, each of said outer modular units including two first-stage switching matrices and two last-stage switching matrices.

13. A network as defined in claim 12 wherein $n=8$.

14. A network as defined in claims 12 or 3 wherein each central modular unit includes two mutually identical middle-stage switching matrices of the same structure as said second-stage and penultimate-stage switching matrices.

15. A network as defined in claim 12 wherein said ancillary circuitry comprises an upstream sampler and a downstream sampler for each switching matrix, said base-level microprocessors being provided with comparison means for detecting disparities between bit combinations respectively extracted by said upstream and downstream samplers, each upstream sampler having inputs directly connected to the inputs of the associated switching matrix, each downstream sampler having inputs at least indirectly connected to the outputs of the associated switching matrix.

* * * * *